Nov. 12, 1968   W. H. SIMON   3,410,454
WELDING ROD DISPENSER
Filed Oct. 22, 1965   3 Sheets-Sheet 1
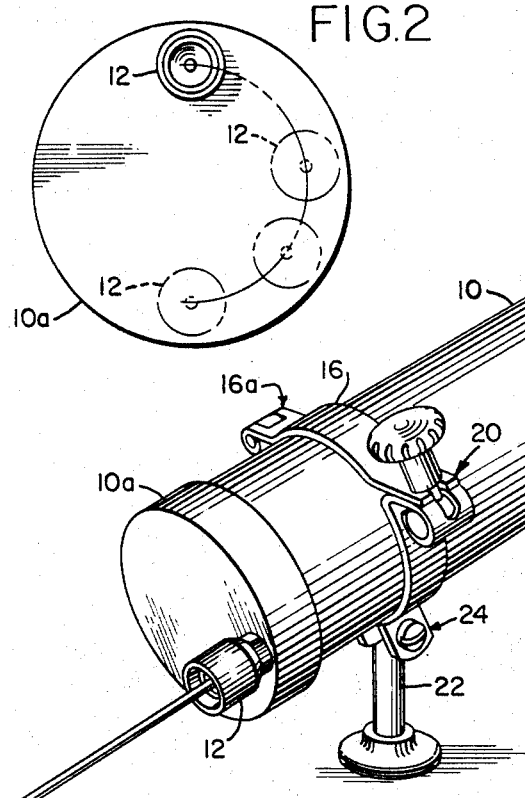
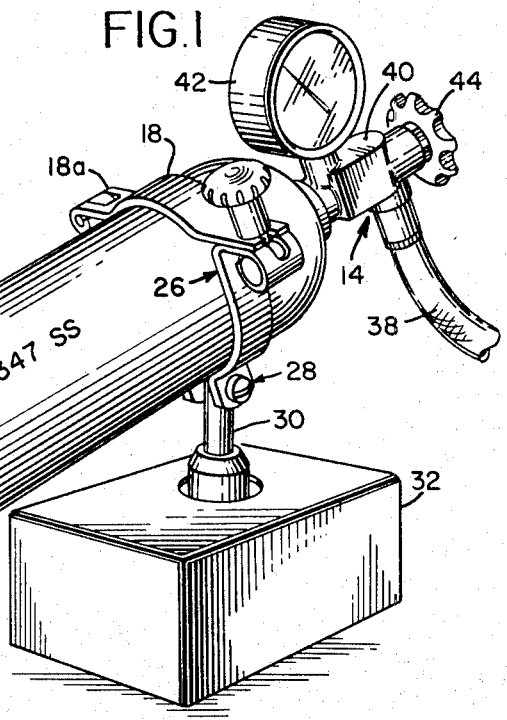
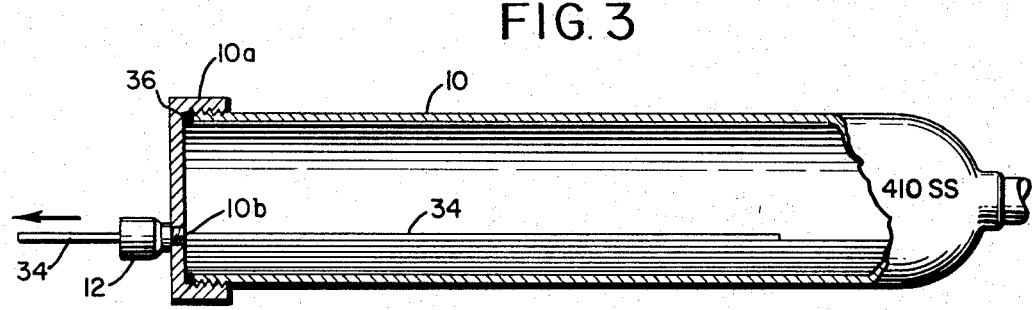
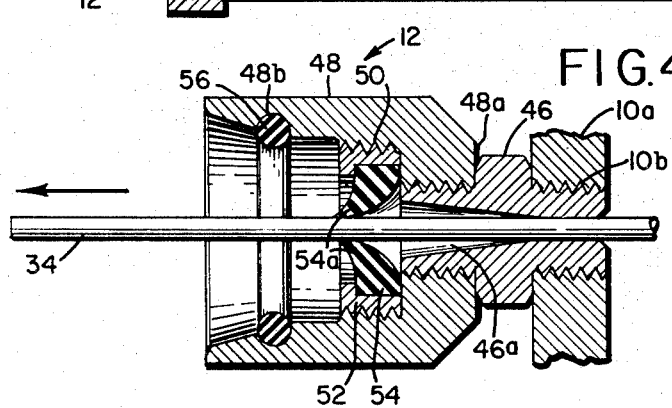
WARNER H. SIMON
INVENTOR
By Warner H. Simon

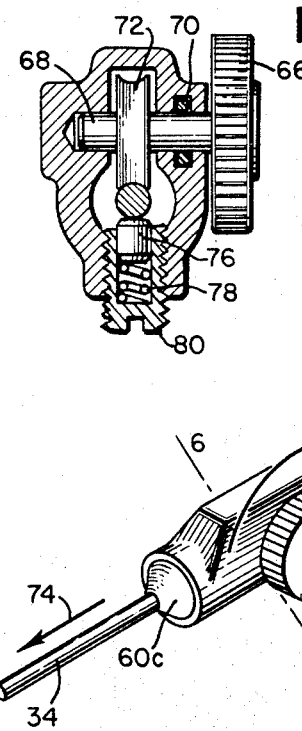
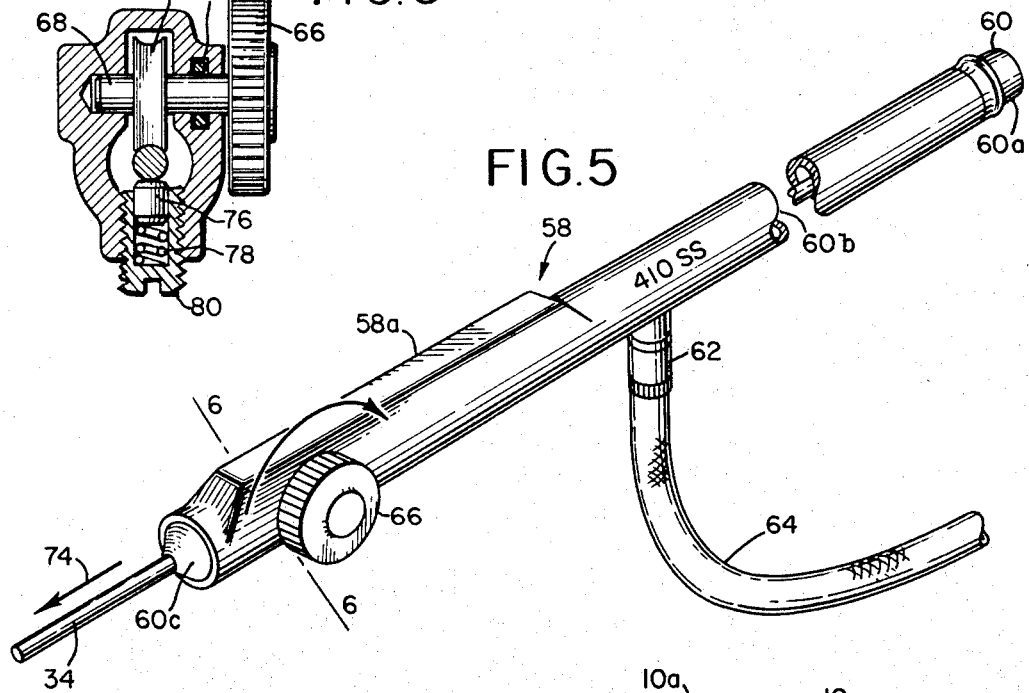
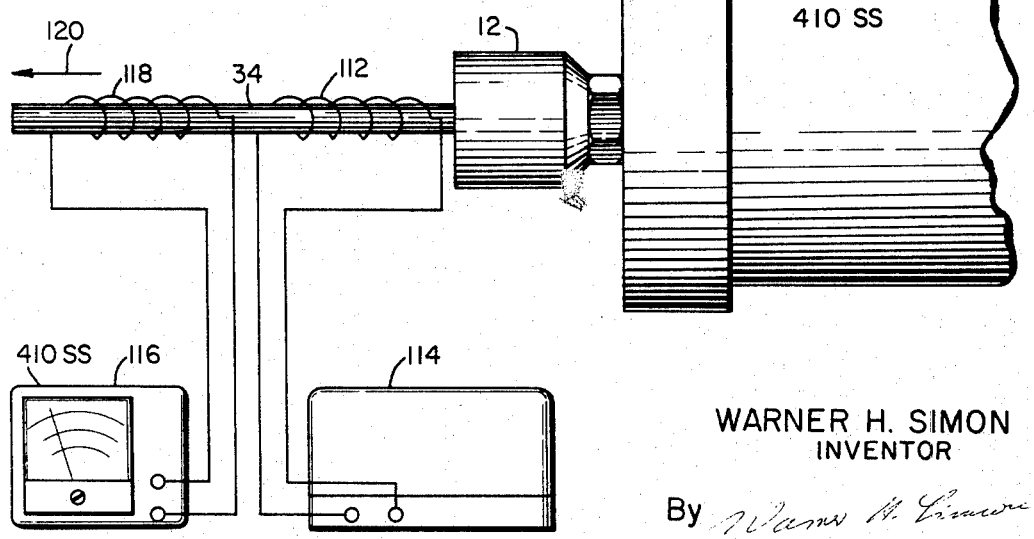

Nov. 12, 1968 W. H. SIMON 3,410,454
WELDING ROD DISPENSER
Filed Oct. 22, 1965 3 Sheets-Sheet 3
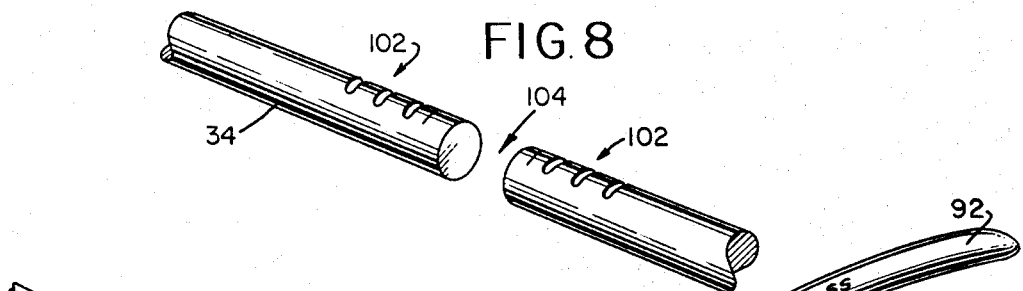
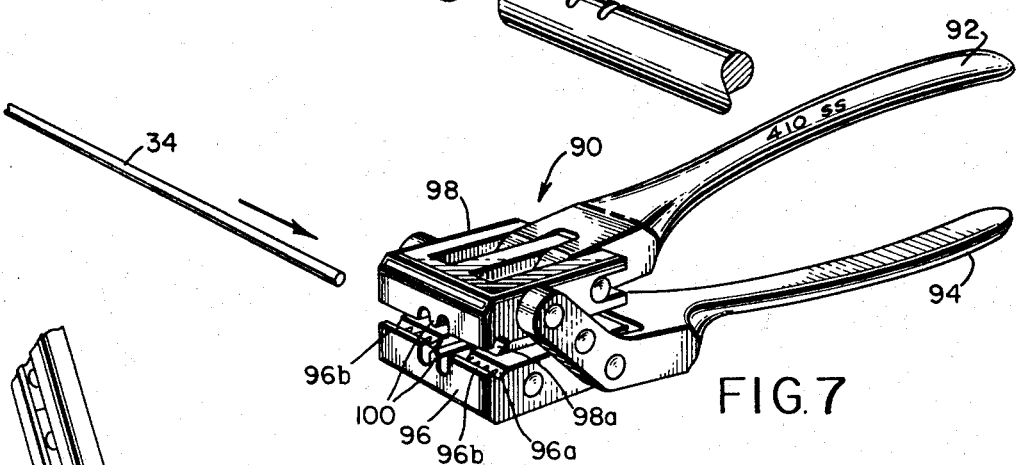
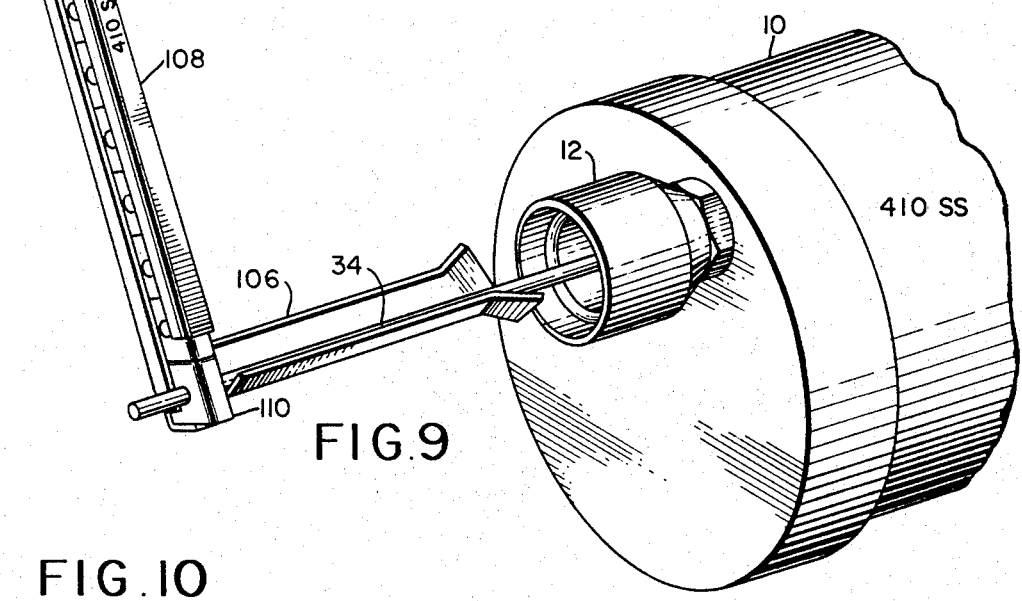
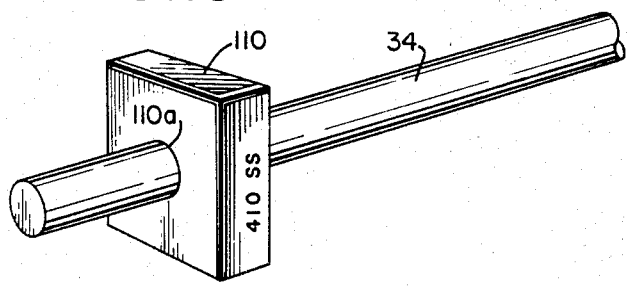
WARNER H. SIMON
INVENTOR
By though the electrodes are
returned to the oven within the prescribed time, organic
substances such as hydrocarbons are not driven off the
electrodes by the relatively low heat in the oven. Placing
the electrodes in the oven causes only water vapor to
evaporate from the electrodes but does not affect the
hydrogen or hydrocarbons interstitially contaminating the
electrodes.

United States Patent Office 3,410,454
Patented Nov. 12, 1968

3,410,454
WELDING ROD DISPENSER
Warner H. Simon, 6511 Comanche Ave.,
Canoga Park, Calif. 91306
Filed Oct. 22, 1965, Ser. No. 502,681
4 Claims. (Cl. 221—204)

ABSTRACT OF THE DISCLOSURE

A welding apparatus for containing, dispensing, protecting, and identifying welding wire. Welding wire is protected from contaminants by a pure inert gas. A container is provided wherein a plurality of welding rods is stored. The rear end of the container is inclined upwardly and a vibrator is used to keep the rods agitated. At the front of the container is an off-center opening covered by a diaphragm with expandable lips forming an aperture through which a rod will pass. These lips are eccentric to the longitudinal axis of the cylinder to prevent reinsertion of a rod through this end. The container is manually rotatable so that the lips of the diaphragm will receive rods at the top of the pile within the container as the top of the pile dwindles in use. Upon vibration of the container a rod in alignment with the lips, with the aid of gravity, will jiggle its way through the lips and be ejected. When vibration ceases the lips close and seal the container. In the alternative a fixed opening may be used and a cap closure placed over it to seal the container.

---

Heretofore, it has been customary to protect welding electrodes in a relatively high-temperature oven to prevent oxidation of the electrodes. Unfortunately, such metal electrodes have a high affinity for hydrogen which is not driven out of the electrodes at the approximately 300° temperature of such ovens. As is mentioned in an article entitled "Welding High Strength Quenched and Tempered Alloy Steels," by George E. Linnert, Metal Progress, August 1965, p. 99, the period of safe usage of such electrodes before they must be returned to the oven may be anywhere from one-half to four hours, depending upon ambient temperature, humidity, and other environmental conditions. Even When coated electrodes which bear identification markings are heated in an oven to elevated temperatures, the identification markings are burned off and the identity is not known. Therefore, with the apparatus shown herein, not only is the need for heating eliminated, but it is unnecessary to have identification markings on the electrode because with the present invention the identification is maintained from the point at which it leaves a dispensing nozzle until such point as it is consumed by the welding arc. Several features of my invention are particularly useful in conjunction with Patent No. 3,108,176, issued to the present inventor. When it is desired to use spooled wire originally intended for welding operations by cutting short pieces it may be done by a combined notching and cutting device, which may be permanently attached to the reel by means of a chain. This device also has the advantage of identifying each end of the wire, that is, on both sides of the cut, to prevent any unidentified pieces which thus precludes unauthorized cut-off of wire at the welding station. In the case of highly reactive metals, such as uncoated aluminum and magnesium, or refractory metal where continuous protection by inert gas is mandatory, the problem of identification is solved by means of the temporary identification device, and the need for identification on the wire itself becomes redundant. A tab assembly is particularly useful for highly critical welding operations, where complete traceability of the welding wire is necessary. The present state of the art requires the use of contaminating colors and/or labels which preclude continuous environmental protection and also may not provide complete traceability. For this reason the present invention is related not only to the identification of a final product but to traceability of a welding wire from its point of manufacture to the point where it is consumed by the welding arc. The example of a wire identified as 410 stainless steel, denoted in the illustrations herein as 410ss. FIGURES 1, 3, 5, 7, 8, 9, 10 and 11 include the identification of 410ss for the welding wire shown. FIGURE 8 is notched with the digits 211 which is the current national identification code for 347 stainless steel welding wire.

The metals which constitute welding rods are particularly susceptible to contamination by such interstitial materials. These materials, even in minute quantities, affect the quality of a weld made with the wire.

In addition, ovens used as storage for such welding rods or wires are usually heated electrically. This, of course, involves considerable cost for the electricity used to heat each oven.

There is a further disadvantage in that electrodes that have been maintained in an environment of 300° F. or higher must be permitted to cool to some extent before they may conveniently be handled. During such cooling time as is required, they will in all probability be further contaminated from materials contained in the atmosphere to which they are exposed while cooling.

In accordance with the present invention, the welding wire is maintained in an atmosphere of inert, unheated gas while it is being stored before use. It is dispensed from a container containing the inert gas through a seal which prevents the inert gas from escaping from the container and prevents air from entering the container. The rods may be dispensed individually directly to a user or may be dispensed through a transfer mechanism, wherein each individual rod is maintained in an inert gas atmosphere.

The present invention also contemplates means for identifying different types of wire as the wire is ejected or removed from the container or transfer means.

In one form of the invention, a container filled with welding rods and an inert gas is shipped from a supplier to a user. Alternatively, a so-called "dry box" may be utilized to load electrodes from a large supply container containing an inert gas into the smaller dispensing container.

One of the principal features of the invention is that the container containing the electrodes and the inert gas feeds the electrodes, one at a time, to a user under force of gravity. The container containing the electrodes is mounted at an angle to the horizontal and is vibrated in order to keep the electrodes in an agitated condition so that they feed through an exit nozzle of the container one at a time rather than becoming jammed thereat. As previously mentioned, each electrode may be fed directly to a user or to a transfer mechanism where it is maintained in an inert gas atmosphere until it is manually removed from the transfer mechanism when it is to be used.

Further features and advantages of the invention will become apparent from the following description, taken in conjunction with the accompanying drawings, in which:

FIGURE 1 is a perspective view of a container embodying the invention;

FIG. 2 is an end view of the container shown in FIG. 1 showing various positions of its exit nozzle;

FIG. 3 is a fragmentary longitudinal sectional view of the container shown in FIG. 1 showing welding rods within the container;

FIG. 4 is a longitudinal sectional view of a nozzle such as might be used with the container shown in FIG. 1;

FIG. 5 is a perspective view, partially broken away, of a transfer mechanism that may be utilized with the container and nozzle shown in FIGS. 1-4;

FIG. 6 is a cross-sectional view taken on the line 6—6 of FIG. 5;

FIG. 7 is a perspective view of a plier-like device for coding and cutting a length of wire;

FIG. 8 is a perspective view of a wire which has been cut and coded by the device shown in FIG. 7;

FIG. 9 is a fragmentary perspective view showing a means of identifying a wire by a tab that is placed upon the wire as it exits from its container or transfer mechanism;

FIG. 10 is a perspective view of the tab referred to in FIG. 9; and

FIG. 11 is a circuit diagram illustrating a different method of identifying wire ejected from a container.

The present invention is applicable to materials such as aluminum, magnesium, low alloy high tensile steels, austenitic stainless steels, precipitation hardening stainless steels, and other metals. It is equally applicable to the welding of titanium, zirconium and reactive metals such as molybdenum and tungsten, because of their high affinity to oxygen and hydrogen, but it is to be understood that the invention is not limited in its applicability to any particular metal or metals.

FIG. 1 illustrates a container 10 embodying the present invention. The container 10 is shown as being cylindrical in shape, and is provided at one end with a dispensing nozzle 12 and at the other end with a gas injecting mechanism, designated generally by the numeral 14.

The container 10 is provided with two straps 16, 18 for mounting purposes. The strap 16 is hinged as at 16a to permit it to be removed from around the container 10 and it may be tightened down by means of a spring clamp designated generally by the numeral 20. At the bottom (as shown in FIG. 1) the clamp 16 is divided and rotatably mounted on a post 22 by means of a conventional pivotal mounting 24. The post 22 is conventionally mounted on a work table or other, preferably horizontal surface.

The clamp 18, located at the other end of the container 10 is similarly provided with a clamp designated generally by the numeral 26 and a hinge 18a. Also, the clamp 18 is divided at the bottom (as seen in FIG. 1) and is pivotally mounted as at 28 to a post 30 actuated by a vibrator 32.

The vibrator 32 is conventional in form and provides, in the example shown, an up-and-down oscillatory motion. It is to be understood that the invention is not limited to any particular oscillatory motion, but requires only motion that will agitate the electrodes within the container 10 so that they will be fed one at a time through the dispensing nozzle 12 without jamming.

The container 10 is mounted on the posts 22 and 30 so that it assumes an angle sufficient to permit gravity feed of the electrodes through the dispensing nozzle 12 when the vibrator is oscillating. The combination of gravity and vibration gives enough force to the rods that a rod will protrude through and enlarge lips 54a and permit ejection of the rod. When the vibrator is shut off the feeding of rods through the nozzle ceases and the opening in the diaphragm closes. In practice, it has been found that an angle of approximately 15° or more is sufficient to accomplish the desired result.

The container 10 is rotatably mounted in the straps 16 and 18 so that the dispensing nozzle 12 may assume various positions such as are shown in FIG. 2. This has two purposes. First, when the nozzle 12 is in the position shown in full lines as in FIG. 2, it permits electrodes to be fed from the top of a full container without the weight of other electrodes impeding its gravitational emission through the dispensing nozzle 12. Second, as the container 10 is rotated electrodes from various portions of the group of electrodes within the container may be selected for quality control inspection.

As shown in FIG. 3, the container 10, which contains welding rods 34 is provided with an end cap 10a which is threaded onto the end of the container 10 remote from the gas dispensing mechanism 14. Of course, a seal 36 is interposed between the end cap 10a and the container 10.

The end cap 10a is provided with a threaded aperture 10b into which threads on the dispensing nozzle 12 are inserted to make, as nearly as possible, an air-tight fitting.

Referring again to FIG. 1, the gas injection mechanism 14 comprises an inlet tube 38 connected to a suitable source of inert gas such as helium or argon, an inlet valve 40 and a pressure gauge 42. The inlet valve 40 may be closed and opened to various degrees by turning an actuating wheel 44. The mechanism 14 is entirely conventional in nature and no further description is deemed necessary. The reason for utilizing the gas injection mechanism 14 is, of course, to replace that gas within the container 10 that escapes as each of the rods 34 is ejected from the container and to maintain the gas pressure within the container sufficiently high to prevent the entry of air through the dispensing nozzle 12.

FIG. 4 is a detailed sectional view of the dispensing nozzle 12. As previously mentioned, the nozzle 12 is threaded into the end cap 10a. This is accomplished by means of a male-male connector 46, one end of which is threaded into the end cap 10a and the other end of which is threaded into an end wall 48a of a cylindrical member 48. The connector 46 is provided with a suitable bore 46a to accommodate the passage of a welding wire 34 therethrough and may or may not be beveled at its end adjacent the container 10, as desired. It is pointed out that beveling that end of the connector 46 may facilitate entry of a welding rod 34 into the dispensing nozzle 12.

The interior of the cylindrical member 48 is threaded, as at 50, to accommodate a threaded insert 52 which contains a sealing member 54. The sealing member 54 is annular in shape and is made of a resilient material, such as a plastic or rubber. The centrally located opening in the member 54 permits a welding rod to pass therethrough with a minimal amount of friction, when passing from right to left as shown in FIG. 4, but lips 54a close in the absence of a welding rod passing therethrough and prevent the entry of air into the container 10. In addition, the lips 54a tend to extend outwardly of the cylindrical member 48 (that is, away from the container 10) to prevent the re-insertion of a partially used and contaminated rod into the container 10.

The cylindrical member 48 is also provided on its interior surface with a groove 48b into which is fitted an O-ring 56, which serves as a seal when the container is utilized with a transfer mechanism, as will be hereinafter described.

FIG. 5 is a perspective view of a transfer mechanism, designated generally by the numeral 58 that may be used in conjunction with the container 10 to dispense one welding rod at a time manually as desired by an operator rather than as a result of continuous gravitational feed independent of an operator's desire.

The transfer mechanism shown in FIG. 5 is provided with an end fitting 60 adapted to be inserted into the cylindrical member 48 of the dispensing nozzle 12 and is provided with a groove 60a which is engaged by the O-ring 56 when the dispensing member is seated in the dispensing nozzle. The dispensing member 58 is also provided with a bore 60b and an exit seal 60c through which a welding rod 34 may pass. Preferably, the seal 60c aids the seal 56 (FIG. 4) in resisting the entrance of air into the rod container 10.

The transfer mechanism 58 is also provided with a suitable fitting 62 to which is connected an inlet hose 64. An inert gas is provided through the host 64 to maintain a welding rod in an inert atmosphere while it is in the transfer mechanism 58.

A welding rod is ejected from the container 10 under the force of gravity, as previously mentioned, and is lodged in the transfer mechanism 58 until it is required for use. It is removed from the transfer mechanism by means of an assembly shown in cross-sectional detail in FIG. 6 by turning a knurled knob 66.

The knurled knob 66 is secured to one end of a shaft 68 which extends through the cylindrical transfer mechanism 58, as shown in FIG. 6. The transfer mechanism 58 has a vertically-extending portion 58a near its exit end to accommodate the shaft 68 and suitable bearings 70. The shaft 68 has fixedly mounted thereon a roller 72 which engages a welding rod 34, so that when the shaft 68 rotates because of the knob 66 being manually turned it advances the welding rod in the direction shown by the arrow 74 in FIG. 5. The welding rod 34 is supported from the bottom (as seen in FIG. 6) by a roller 76, which is pressed against the rod 34 by means of a spring 78. The spring 78 is maintained in position by a plug 80 threaded into the under side of the portion 58a of the transfer mechanism 58 opposite the roller 72. The plug 80 is advanced into the transfer mechanism 58 to an extent to cause the rollers 72 and 76 to exert sufficient pressure on the rod 34 to cause it to be advanced when the knob 66 is rotated.

One of the more important features of the invention is the provision of identification means for the welding wire ejected from the container 10 or the transfer mechanism 58. In the welding art it is not necessary that an entire wire of predetermined length is needed at one time. Therefore, it may be necessary to cut off a section of one of the wires to be used. The section of the wire cut off and the section of the wire remaining must both be identified as to the type of wire. In the past various methods of coding have been employed, but they did not include coding both the section cut off and the section of wire remaining. Such methods have included notching the cut-off section of wire with a coded combination of notches, putting colored codes on the cut-off section of wire and putting tape around the wire to identify its composition. Unfortunately, these methods have not included any means of telling the welder what type of wire he will next be obtaining from the dispenser or transfer mechanism.

FIG. 7 shows a plier-like device 90, provided with handles 92 and 94, each respectively connected to jaws 96, 98 to exert pressure on a wire placed between the jaws in grooves 96a and 98a, respectively. The grooves 96a and 98a, are provided, one or the other or both, with teeth 96b, shown only in the lower groove, which provide notches in a wire inserted into the device 90 when the handles are depressed.

The device 90 is also provided with an opposed pair of cutting surfaces or edges 100 which cut a welding rod or the like, but identify by means of notches both the section cut off and the section of wire remaining.

FIG. 8 illustrates a welding wire which has been cut and coded by the device shown in FIG. 7 and particularly showing coding marks designated generally by the numeral 102 located on each side of a cut 104.

FIG. 9 shows another way of identifying particular materials dispensed from the container 10 shown in FIG. 1 or the transfer mechanism 58 shown in FIG. 5. As shown, the rods or wire 34, after being emitted from the dispensing nozzle 12 are propelled by gravity down a trough 106. At the end of the trough 106 is located a dispensing mechanism 108, which dispenses, one at a time, tabs 110 having apertures 110a therein through which each rod or wire 34 may extend.

Normally, the wire 34 would be cut on the outboard (or left as seen in FIG. 9) side so that the identification tab would remain on the portion of the wire 34 that is not being used. Alternatively, two dispensing mechanisms 108 may be provided to provide two tabs with a predetermined space therebetween and the wire 34 cut between the two tabs so that each segment of the wire is identified.

FIG. 11 illustrates another method of identifying the wire 34 being ejected from the container 10 through the dispensing nozzle 12. After the wire is ejected it is first annealed by passing through a coil 112 energized by a suitable power supply 114. This process is conventional in the art and a detailed description is not believed necessary. The annealing process accomplished by passing the welding wire through the coil 112 serves only to stabilize the metallurgical properties of the wire 34 so that its electrical reluctance may be measured by a meter 116. The meter 116 is connected to a coil 118 through which the rod 34 passes as it is emitted through the nozzle 12 in the direction indicated by the arrow 120, which indicates in the meter 116 the reluctance of the metal passing through the coil 118. Such meters are well known in the art, one being known as the Model LI–1832, manufactured by Apollo Instruments, Inc. of Gardena, Calif. Such instruments as mentioned can identify at least eight different materials of any of five diameters.

As previously mentioned, individual containers 10 filled with welding rods 34 may be shipped from a manufacturer to a user each container 10 being filled with an inert gas and properly sealed. Alternatively, the rods may be shipped in larger quantities in non-dispensing containers and transferred to the smaller dispensing containers 10 by the user or distributor to the user. In that case, the larger shipping containers would, of course, contain an inert gas to protect the electrodes during shipment. A so-called "dry box" would then be utilized to transfer the electrodes from the supply container into the dispensing container. A dry box is a relatively large completely enclosed container which, in the present case, is filled with an inert gas and having sealed entry ports for an operator, whereby the operator can transfer the electrodes from the supply container to the dispensing container, such as by using gloves sealed into ports in the container, without breaking the seal between the interior of the dry box and the atmosphere. The use of a dry box is presented only as being illustrative of a way in which the present invention may be alternatively used to decrease the cost of welding rods to an eventual user.

It will be appreciated that various modifications can be made in the embodiments of the invention illustrated and described that will fall within the true spirit and scope of the invention.

What is claimed is:
1. A welding rod dispenser comprising:
   a container for a plurality of welding rods,
   said container having an end cap at one end thereof with an off-center opening therein, said opening being of a size to permit outward passage of a welding rod therethrough,
   means for mounting said container at an incline to horizontal with said end cap at the low end thereof, said container being rotatable to position said opening relative to the supply of rods in said container, and
   vibration means agitating said rods to thereby align one of said rods with said opening for ejection therefrom.

2. A welding rod dispenser as set forth in claim 1, and a nozzle over said opening:
    said nozzle having a resilient annular sealing member therein,
    said sealing member having lips defining an opening through which said welding rods may pass.

3. A welding rod dispenser as set forth in claim 2, wherein said lips are outwardly extending and are eccentric to the longitudinal axis of said container.

4. A welding rod dispenser as set forth in claim 1, wherein said container has means thereon for attachment to an external gas source.

References Cited

UNITED STATES PATENTS

| | | | |
|---|---|---|---|
| 1,012,106 | 12/1911 | Seavey | 221—204 |
| 2,074,674 | 3/1937 | Sadjian | 221—267 |
| 2,932,422 | 4/1960 | Harrigan | 221—298 |
| 3,164,297 | 1/1965 | Wills | 221—254 |

WALTER SOBIN, *Primary Examiner.*